Nov. 6, 1934.　　　　M. PIER ET AL　　　　1,979,841
NONKNOCKING MOTOR FUEL
Filed Oct. 3, 1929
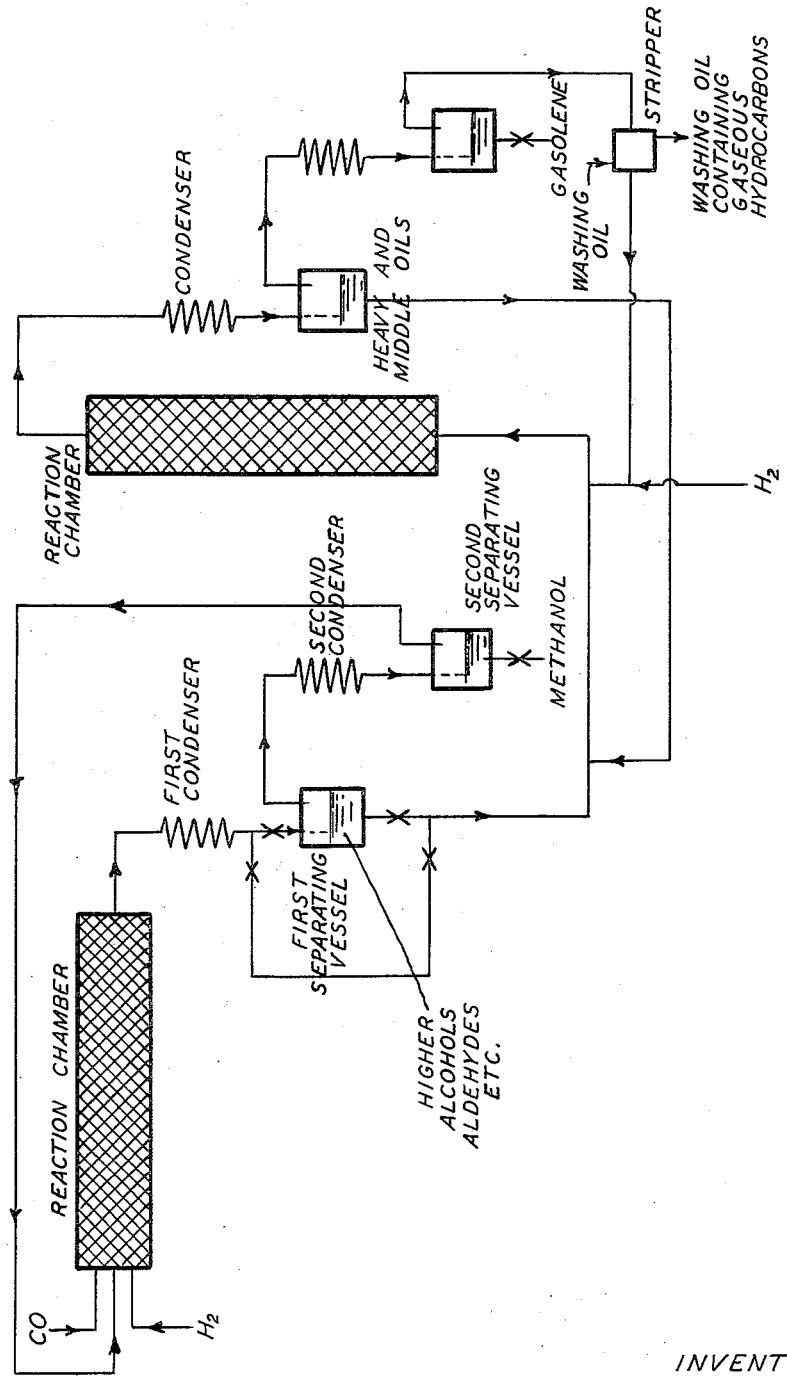
INVENTORS
MATHIAS PIER
FRIEDRICH RINGER
BY Hauff & Warland
ATTORNEYS.

Patented Nov. 6, 1934

1,979,841

UNITED STATES PATENT OFFICE 1,979,841

NONKNOCKING MOTOR FUEL

Mathias Pier, Heidelberg, and Friedrich Ringer, Ludwigshafen-on-the-Rhine, Germany, assignors, by mesne assignments, to Standard-I. G. Company, Linden, N. J., a corporation of Delaware Application October 3, 1929, Serial No. 397,145
In Germany October 20, 1928

7 Claims. (Cl. 196—53)

This invention relates to improvements in the manufacture and production of non-knocking motor fuels.

We have found that the branched chain hydrocarbons boiling within the benzine range or mixtures thereof which are prepared by catalytic destructive hydrogenation of alcohols or aldehydes containing side chains and more than three carbon atoms in the molecule, which expression is also intended to include mixtures containing the said compounds, when employed in admixture with motor fuels, which by themselves have a tendency to knock, entirely suppress this undesirable property. Preferably only such products or fractions thereof are employed as additions to the fuels as contain substantially no constituents boiling above 180° C. The treatment necessary for the production of said branched chain hydrocarbons from said alcohols or aldehydes containing side chains is carried out for a longer period of time than is usually required for the destructive hydrogenation of carbonaceous materials with a hydrogenating gas comprising hydrogen and carbon monoxide such as is described in Example 19 of the Australian Patent No. 1,217 of 1926.

Alcohols or aldehydes of aliphatic or hydroaromatic nature or aldehyde mixtures, or mixtures of alcohols containing more than three carbon atoms are suitable initial materials for the production of hydrocarbons or hydrocarbon mixtures by catalytic reduction as hereinbefore stated. Particularly good results are obtained in practice by the employment of the so-called "isobutyl oils", namely oxygen containing oily products of a higher order than methanol obtained in greater or smaller amounts as by-products in the synthesis of methanol from gases comprising oxides of carbon, more especially carbon monoxide and hydrogen. The said "isobutyl oils" are highly concentrated mixtures consisting of isobutyl alcohol and other high alcohols containing side chains, aldehydes, ketones, especially such of cyclic nature and alcohols. Such compounds of a higher order than methanol containing branched chains and which upon reduction yield hydrocarbons with branched chains boiling within the benzine range are obtained in particularly large amounts if the gases comprising oxides of carbon, more especially carbon monoxide and hydrogen be allowed to pass at a low speed over a catalyst capable of forming methanol and in particular a catalyst containing substantial amounts of a difficultly reducible metal oxide and if desired, a compound of potassium. The temperature employed is preferably between about 350° and 500° C. Such compounds or mixtures may also be obtained by allowing carbon monoxide or a gas containing carbon monoxide to act on a vapourized aliphatic alcohol or an ester thereof or both alcohols and esters with the aid of a catalyst containing a constituent of a hydrating nature alone or in conjunction with a hydrogenating constituent and/or an alkali or alkaline earth metal compound, at an elevated temperature and under elevated pressure. The aldehydes are preferably reduced in a vaporized condition by means of hydrogen to the said hydrocarbons.

The quantity of hydrogen employed for the catalytic reduction of the aforesaid oxygenated products is of the nature of that generally employed in the conversion of carbonaceous compounds into saturated hydrocarbons by destructive hydrogenation. See U. S. Patent 1,890,434 of December 6, 1932. The duration of treatment necessary for producing the desired conversion will depend in each case upon the particular materials treated and the conditions of the reaction. Generally speaking, however, the duration of treatment will be that necessary to convert the particular oxygenated parent materials selected to hydrocarbons similar to benzines under the reaction conditions employed.

The mixtures of motor fuels having a tendency to knock with the products hereinbefore referred to may be prepared in any desired manner. Thus it has been found to be very advantageous to add the aforesaid alcohols or aldehydes containing side chains and more than three carbon atoms in the molecule, as for example "iso-butyl oils" to materials, which are to be subjected to destructive hydrogenation for the production of gasoline. In this manner a reaction product is obtained which shows substantially no tendency to knock. Excellent non-knocking gasolines are also obtained if the said oxygen containing compounds be admixed with crude gasoline which is to be refined by treatment with a gas containing hydrogen at temperatures above 300° C., under a pressure of at least 10 atmospheres in the presence of a catalyst which is immune against poisoning by sulphur, for such a period of time only that no substantial decomposition to gaseous hydrocarbons and such of low boiling point range takes place. The oxygen containing compounds are thereby converted into hydrocarbons similar to benzine.

The motor fuels with which the said hydrocarbons are mixed may be of any origin and should preferably contain no constituents boiling above 180° C. Gasolines are substantially improved by the said additions. The said motor fuels may consist of hydrocarbons, or may consist of or comprise other combustible liquids such as alcohols or ethers. For example gasoline containing a small proportion of alcohol may be added. Other anti-knock agents such as iron carbonyl and the like may also be present. The mixtures may also contain benzene or hydroaromatic hydrocarbons.

The proportions of the aforesaid hydrocarbons obtained by reduction, which may be added may be varied within wide proportions, and additions of between 10 and 50 per cent give excellent results as regards economy. The greater the amount of the addition, the higher will be the degree in which knocking is suppressed. Additions in amounts greater than 50 per cent may of course be employed, for example amounts of up to 95 per cent.

The additions hereinbefore described, in so far as they are mixtures, have the advantages in contrast to benzene or the other additions already known to be anti-knocking agents that they have a uniform boiling point curve so that a break in the boiling point curve, such as has been produced hitherto by the addition of one single substance in large amounts and which injuriously affects the uniform combustion in the motor is not produced with the said additions. The motor fuels thus obtained are eminently suitable for special purposes as for example for the operation of aircraft motors or for the operation of racing vehicles, since in addition to a high anti-knocking action they frequently have a very low specific gravity.

A plant suitable for carrying out our invention is illustrated diagrammatically in the accompanying drawing on which suitable legends are inscribed thereby rendering any detailed discussion thereof unnecessary.

It is to be noted that one of two procedures can be adopted in passing the products from the methanol reaction chamber to the destructive hydrogenation chamber. These products can be passed through a first condenser and then into a separating vessel from which the higher boiling aldehydes and alcohols can be drawn off and sent into the destructive hydrogenation chamber after an addition of hydrogen. The lower boiling products of the methanol synthesis are then passed through a second condenser in which the normally liquid products are separated and from which oxide of carbon, hydrogen, methane, etc. are led back to the methanol reaction chamber.

If the methanol synthesis is so conducted as to get mainly higher boiling products, these products, after passing through the first condenser, are by-passed around the separating vessels directly into the feed line into the destructive hydrogenation reaction chamber.

The following examples will further illustrate how the said invention may be carried out in practice, but the invention is not restricted to these examples.

*Example 1*

A mixture very rich in aldehydes which mainly boils up to about 150° C. and which has been obtained by catalytic reduction of carbon monoxide with hydrogen under a pressure of about 200 atmospheres and at a temperature of about 475° to 500° C. in the presence of a catalyst consisting of zinc oxide and chromium oxide is treated at 370° C. and at 200 atmospheres pressure with hydrogen in the presence of a catalyst prepared from molecular proportions of molybdic acid, zinc oxide and magnesia. In this manner compounds rich in oxygen are completely converted into hydrocarbons similar to benzine without any appreciable displacement of the boiling point curve taking place. The product has for the greater part paraffinic nature, and yet it has been found, contrary to expectation, that it does not knock in a motor. The paraffins formed in addition to comparatively small amounts of naphthenes consist almost exclusively of compounds having side chains. By mixing a gasoline obtained from Pennsylvanian crude oil which knocks strongly when under high compression with 40 per cent by volume of the gasoline obtained, as hereinbefore described, a gasoline is obtained which may be used even in motors with a high compression ratio and which by reason of its high calorific power is eminently suitable for special purposes as for example for driving aircraft motors.

*Example 2*

A mixture containing mainly higher alcohols and boiling mainly between 150° and 200° C. which has been obtained by catalytic reduction of carbon monoxide with hydrogen under a pressure of about 200 atmospheres and a temperature of about 475° and 500° C. in the presence of a catalyst consisting of zinc oxide, chromium oxide and oxides of manganese, is treated with hydrogen at 440° C. and 200 atmospheres pressure in the presence of the catalyst specified in Example 1. In this manner with the reduction of the whole of the oxygen to water and with the simultaneous lowering of the boiling point curve a product is obtained which consists to the extent of about 90 per cent of gasoline and which corresponds to the normal boiling point curve of commerce. This gasoline has a very low specific gravity and consists mainly of paraffin hydrocarbons having side chains which in admixture with knocking fuels has similar good properties to the motor fuel prepared according to Example 1.

*Example 3*

By treating a difficultly refinable brown coal low temperature distillation benzine with hydrogen at 370° C. and at 200 atmospheres pressure in the presence of the catalyst specified in Example 1, a water white and pleasant smelling gasoline is obtained, but this is not non-knocking when used in motors with high compression. By leading this gasoline together with about 30 per cent of a mixture rich in aldehydes such as is employed in Example 1 over the same catalyst, thus combining the reduction of the aldehydes with the refining of the brown coal low temperature distillation benzine, an excellent motor fuel of low specific gravity and high calorific power is obtained which is very suitable for example for employment in racing vehicles.

What we claim is:—

1. A process for the production of a non-knocking motor fuel which comprises catalytically reducing compounds selected from the group consisting of aldehydes and alcohols having side chains and containing more than three carbon atoms in their molecules, which upon reduction furnish hydrocarbons having branched chains and boiling within the benzine range, with an excess of hydrogen sufficient to convert said compounds into saturated hydrocarbons under a temperature of from about 350° C. to about 500° C. and a pressure suitable for destructive hydrogenation in the presence of a hydrogenating catalyst immune to sulphur poisoning for such a time that substantially all the parent material is converted into hydrocarbons similar to benzines and for the most part paraffinic in nature.

2. A process for the production of a non-knocking motor fuel which comprises treating a mixture of aldehydes obtained in the catalytic reduction of carbon monoxide with hydrogen which boil up to about 150° C., which possess side chains and upon reduction yield hydrocarbons having branched chains and boiling within the benzine range with an excess of hydrogen sufficient to convert said mixture into saturated hydrocarbons under a temperature of about 350° C. to about 500° C. and a pressure suitable for destructive hydrogenation in the presence of a hydrogenating catalyst immune to sulphur poisoning for such a time that substantially all the parent material is converted into hydrocarbons similar to benzines and for the most part paraffinic in nature.

3. The process as defined in claim 2 wherein the parent material converted is "isobutyl oil".

4. A process for the production of a non-knocking motor fuel which comprises subjecting a mixture of a crude gasoline and compounds selected from the group consisting of aldehydes and alcohols containing side chains and more than three carbon atoms in a molecule, which upon reduction furnish hydrocarbons having branched chains and boiling within the benzine range, to the action of an excess of hydrogen sufficient to convert said compound into saturated hydrocarbons under a temperature of about 350° C. to about 500° C. and a pressure suitable for destructive hydrogenation in the presence of a hydrogenating catalyst immune to sulphur poisoning for such a time that substantially all the mixture is converted into hydrocarbons similar to benzines and for the most part paraffinic in nature.

5. A process for the production of a non-knocking motor fuel which comprises subjecting "isobutyl oil" essentially comprising constituents having side chains and which upon reduction furnish hydrocarbons having branched chains and boiling within the benzine range to the action of an excess of hydrogen sufficient to convert the "iso-butyl oil" into saturated hydrocarbons under a temperature of about 370° C. and a pressure of about 200 atmospheres in the presence of a hydrogenating catalyst immune to sulphur poisoning comprising a metal of the sixth group of the periodic system for such a time that substantially all the parent materials are converted into hydrocarbons similar to benzines and for the most part paraffinic in nature.

6. A process as defined in claim 5 wherein the parent material employed is a mixture of "iso-butyl oil" and a crude difficultly refinable brown coal low temperature distillation benzine.

7. The process according to claim 1 in which the initial material is a mixture of higher alcohols boiling mainly between 150° and 200° C. and obtainable by the catalytic reduction of carbon monoxide with hydrogen.

MATHIAS PIER.
FRIEDRICH RINGER.